(12) United States Patent
Huang et al.

(10) Patent No.: US 12,121,988 B2
(45) Date of Patent: Oct. 22, 2024

(54) HEAT TRANSMITTING DEVICE

(71) Applicant: Delta Electronics, Inc., Taoyuan (TW)

(72) Inventors: Shih-Lin Huang, Taoyuan (TW); Tai-De Qi, Taoyuan (TW); Zhen-Hua Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/353,427

(22) Filed: Jul. 17, 2023

(65) Prior Publication Data

US 2024/0017347 A1    Jan. 18, 2024

Related U.S. Application Data

(63) Continuation of application No. 16/807,649, filed on Mar. 3, 2020, now abandoned.

(30) Foreign Application Priority Data

Mar. 29, 2019    (CN) .......................... 201910251155.5

(51) Int. Cl.
  *B23K 101/14*    (2006.01)
  *B23K 20/10*    (2006.01)
  *F28D 15/02*    (2006.01)

(52) U.S. Cl.
  CPC .............. *B23K 20/10* (2013.01); *F28D 15/02* (2013.01); *B23K 2101/14* (2018.08); *F28F 2275/065* (2013.01)

(58) Field of Classification Search
  CPC ...... B23K 2101/14; B23K 2101/04–06; B23K 20/10; B23P 2700/09; F28D 15/0283; F28D 15/0233; F28D 15/02; F28F 2275/065; F28F 2275/06
  USPC ....................................................... 228/178
  See application file for complete search history.

(56) References Cited

U.S. PATENT DOCUMENTS

| | | | |
|---|---|---|---|
| 2002/0088525 A1* | 7/2002 | Jahn ................... | B29C 66/1122 156/73.1 |
| 2007/0294892 A1 | 12/2007 | Yang et al. | |
| 2008/0078531 A1 | 4/2008 | Chung et al. | |
| 2008/0141872 A1* | 6/2008 | Jeng ................... | B21C 37/0803 100/35 |
| 2010/0251547 A1 | 10/2010 | Yijima et al. | |
| 2013/0056025 A1 | 3/2013 | Widhalm | |

(Continued)

FOREIGN PATENT DOCUMENTS

| | | | | |
|---|---|---|---|---|
| JP | 2001324287 A | * | 11/2001 | ......... F28D 15/0283 |
| JP | 20011324287 A | | 11/2001 | |
| WO | WO-2018199215 A1 | * | 11/2018 | ............. F28D 15/02 |

*Primary Examiner* — Frantz F Jules
*Assistant Examiner* — Jason N Thompson
(74) *Attorney, Agent, or Firm* — Muncy, Geissler, Olds & Lowe, P.C.

(57) ABSTRACT

A heat transmitting device is provided, including a main body and an integrating portion. The main body has at least one opening. The integrating portion is used to seal the opening, and has a first surface and a second surface opposite the first surface. A first welding pattern is formed on the first surface, a second welding pattern is formed on the second surface, and the position of the first welding pattern corresponds to that of the second welding pattern. The type of the first welding pattern and the type of the second welding pattern are asymmetric.

19 Claims, 6 Drawing Sheets

(56) References Cited

U.S. PATENT DOCUMENTS

| | | | |
|---|---|---|---|
| 2016/0043360 A1* | 2/2016 | Byun | B23K 20/106 |
| | | | 156/580.2 |
| 2016/0193702 A1* | 7/2016 | Yang | H01L 21/4882 |
| | | | 29/890.054 |
| 2016/0221131 A1 | 8/2016 | Shen | |
| 2017/0248378 A1 | 8/2017 | Aoki et al. | |
| 2017/0343299 A1* | 11/2017 | Huang | F28D 15/046 |
| 2019/0151983 A1* | 5/2019 | Li | B23K 26/361 |
| 2019/0271511 A1 | 9/2019 | Kishimoto et al. | |

* cited by examiner

HEAT TRANSMITTING DEVICE

CROSS REFERENCE TO RELATED APPLICATIONS

This application is a Continuation of application Ser. No. 16/807,649, filed Mar. 3, 2020, which claims the benefit of China Patent Application No. 201910251155.5, filed Mar. 29, 2019, the entirety of which is incorporated by reference herein.

BACKGROUND OF THE INVENTION

Field of the Invention

The application relates in general to a heat transmitting device, and in particular, to a heat transmitting device having welding patterns.

Description of the Related Art

Increased numbers of transistors deployed in a unit area of an electronic element produce considerable heat during operation. Heat-transfer devices provide a simple and effective heat dissipation solution, and are thus widely used. Heat dissipation is achieved by way of energy transmitted through the phase change between gas and liquid of a working medium. In a vaporization section, the working medium removes heat energy from a heat source. The vapor that is produced fills a vacuum within the pipe. In a condensation section, vapor in the vacuum is condensed into a liquid and releases heat energy. The working medium flows back to the vaporization area through the capillarity of the wick within the heap pipe, thus continuously and effectively transmitting and dissipating heat away from the heat source.

A common heat-transfer device is a tubular heat pipe. The ends of the heat pipe have to be sealed by shrinking pipe or micro arc spot welding. However, the aforementioned method generates a large invalid region, and may create a gap at the edge which reduces the air tightness. Thus, how to address the aforementioned problem has become an important issue.

BRIEF SUMMARY OF INVENTION

To address the deficiencies of conventional products, an embodiment of the invention provides a heat transmitting device, including a main body and an integrating portion. The main body has at least one opening. The integrating portion is used to seal the opening, and has a first surface and a second surface opposite the first surface. A first welding pattern is formed on the first surface, a second welding pattern is formed on the second surface, and the position of the first welding pattern corresponds to that of the second welding pattern. The type of the first welding pattern and the type of the second welding pattern are asymmetric.

A heat transmitting device is provided, including a main body and an integrating portion. The main body has at least one opening. The integrating portion is used to seal the opening, and has a first surface and a second surface opposite the first surface. A first welding pattern is formed on the first surface, a second welding pattern is formed on the second surface, and the position of the first welding pattern corresponds to that of the second welding pattern. The pattern density of the first welding pattern is different from the pattern density of the second welding pattern.

A heat transmitting device is provided, including a main body and an integrating portion. The main body has at least one opening. The integrating portion is used to seal the opening, and has a first surface and a second surface opposite the first surface. A first welding pattern is formed on the first surface, a second welding pattern is formed on the second surface, and the position of the first welding pattern corresponds to that of the second welding pattern. The pattern design of the first welding pattern is different from the pattern design of the second welding pattern.

In the aforementioned embodiments, the integrating portion has a tapered structure. The integrating portion has a first end and a second end opposite the first end. The first end is connected to the main body and has a first width, the second end has a second width, and a distance is formed between the first end and the second end. The second width is 0.5-1.2 times the first width, and the distance is 1.0-1.5 times the first width. In some embodiments, the width of the first end is substantially the same as the width of the main body.

In some embodiments, the integrating portion is a heat pipe or a vapor chamber.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the heat transmitting device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
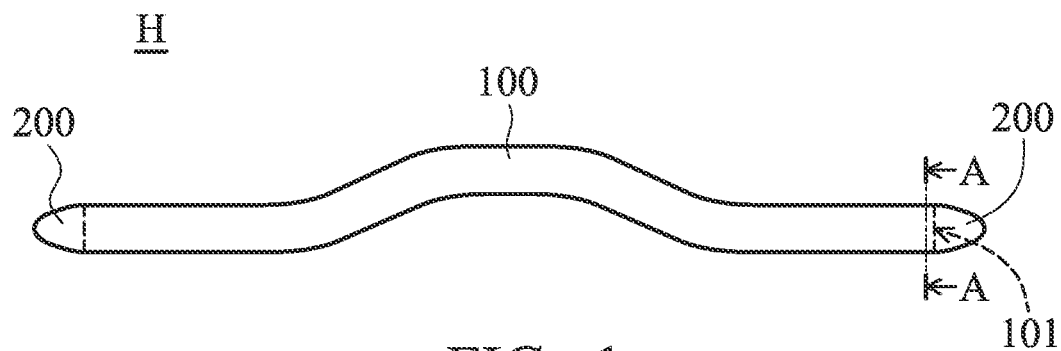
FIG. 1 is a schematic diagram of a heat transmitting device according to an embodiment of the invention.
Figure 2:
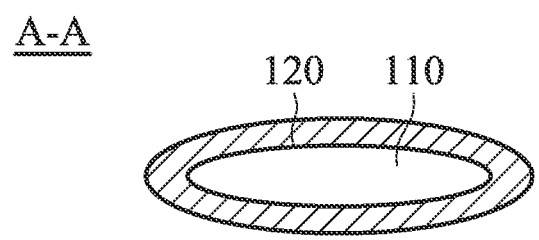
FIG. 2 is a cross-sectional view along the line A-A in FIG. 1.

FIG. 1 is a schematic diagram of a heat transmitting device H according to an embodiment of the invention, and FIG. 2 is a cross-sectional view along the line A-A in FIG. 1. As shown in FIGS. 1 and 2, the heat transmitting device H primarily includes a main body 100 and at least one integrating portion 200. A working medium (such as inorganic compound, pure water, alcohol, ketone, liquid metal, refrigerant, organic compound, or mixture thereof) can be disposed in an accommodating space 110 of the main body 100, and a capillary structure can be formed on the wall surface of the accommodating space 110.

An opening 120 communicating with the accommodating space 110 can be formed on an end 101 of the main body 100, and the integrating portion 200 is formed by deforming the main body 100 to seal the opening 120. In this embodiment, the heat transmitting device H is a heat pipe. In some embodiments, the heat transmitting device is a vapor chamber.

Figure 3A:
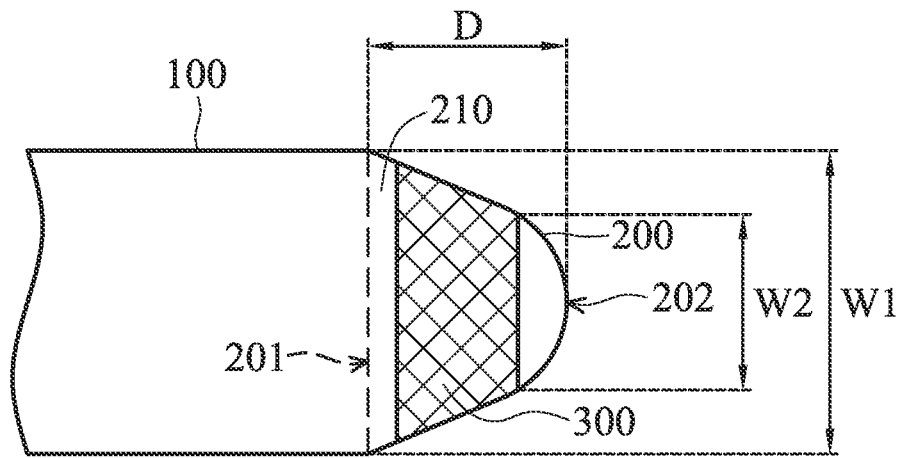
FIG. 3A is a schematic diagram of a first welding pattern according to an embodiment of the invention.
Figure 3B:
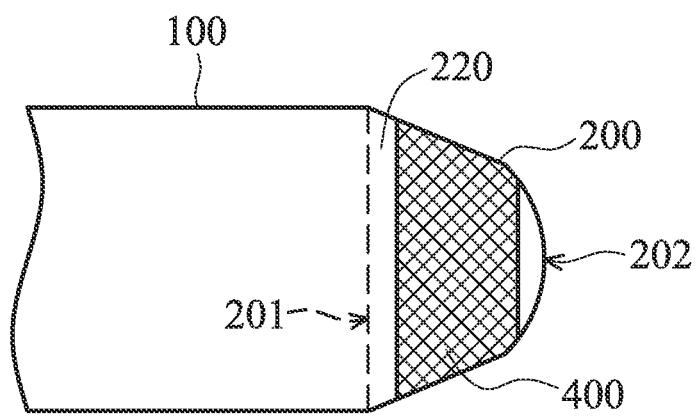
FIG. 3B is a schematic diagram of a second welding pattern according to an embodiment of the invention.

The integrating portion 200 is formed by sealing the opening 120 of the main body 100 via welding (such as ultrasonic welding). As shown in FIGS. 3A and 3B, the integrating portion 200 has a first surface 210 and a second surface 220 opposite the first surface 210. After welding, a first welding pattern 300 and a second welding pattern 400 are respectively formed on the first surface 210 and the second surface 220, and the positions of the first welding pattern 300 and the second welding pattern 400 are corresponded to each other.

Specifically, the first welding pattern 300 and the second welding pattern 400 can include different types. For example, in this embodiment, the pattern density of the first welding pattern 300 is different from that of the second welding pattern 400. Furthermore, referring to FIGS. 4A and 4B, in some embodiments, the pattern type of the first welding pattern 300A is different from that of the second welding pattern 400A. The first welding pattern 300A on the first surface 210A of the integrating portion 200A is an arrangement of a plurality of diamonds (FIG. 4A), and the second welding pattern 400A on the second surface 220A of the integrating portion 200A is an arrangement of a plurality of rectangles. In other words, the types of the first welding pattern and the second welding pattern are asymmetric (for example, the types of the first and the second welding patterns 300 and 400 are asymmetric, or the types of the first and the second welding patterns 300A and 400A are asymmetric).

Referring to FIGS. 1-3B, the integrating portion 200 can include a tapered structure. In detail, the integrating portion 200 has a first end 201 and a second end 202 opposite the first end 201, and the first end 201 is connected to the main body 100 of the heat transmitting device H. The width of the first end 201 is a first width W1, the width of the second end 202 is a second width W2, and the distance between the first end 201 and the second end 202 is distance D.

In this embodiment, the first width W1 is greater than the second width W2, the second width W2 is 0.6 times the first width W1, and the distance D is 1.2 times the first width W1. Furthermore, the width W1 is substantially the same as the width of the main body 100, so that there is no protrusion of the appearance of the heat transmitting device H, the disposition of the heat transmitting device H becomes flexible. In some embodiments, the second width W2 is 0.5-1.2 times the first width W1, and the distance D is 1.0-1.5 times the first width W1.

Figure 5A:
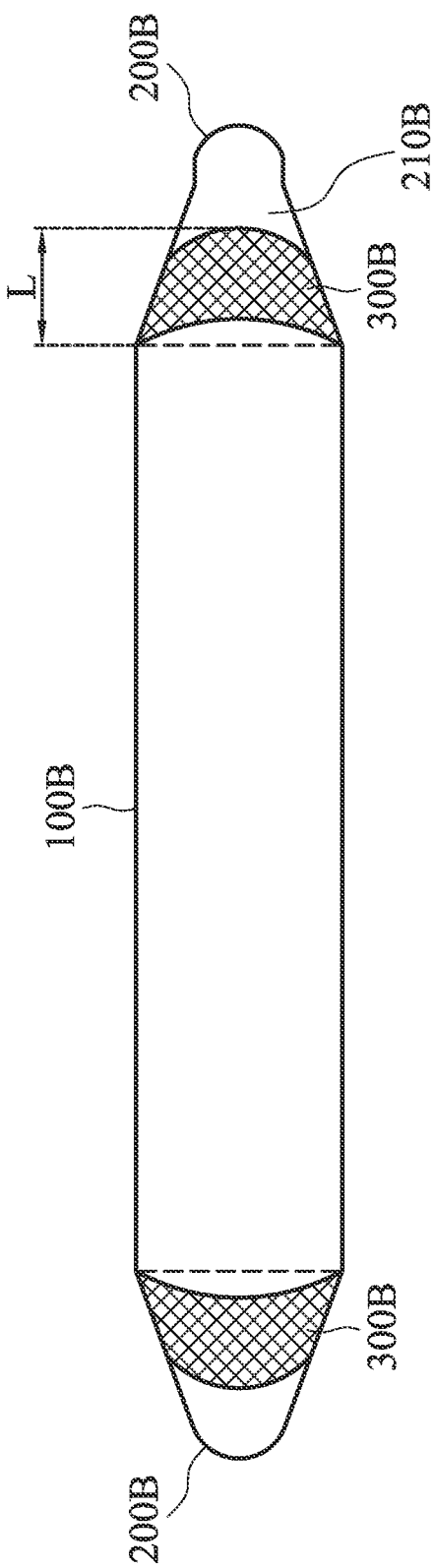
FIGS. 5A and 5B are schematic diagrams of a heat transmitting device according to another embodiment of the invention.
Figure 5B:
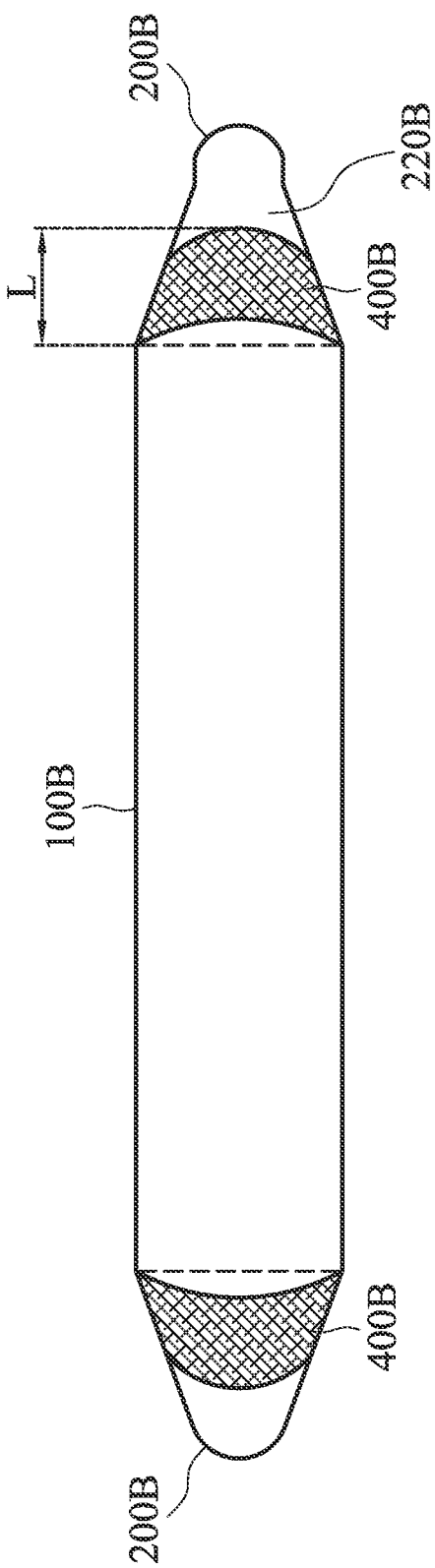

Referring to FIGS. 5A and 5B, in some embodiments, the first welding pattern 300B and the second welding pattern 400B are respectively formed on the first surface 210B and second surface 220B of the integrating portion 200B. The end of the first welding pattern 300B connecting the main body 100 or the end of the second welding pattern 400B connecting the main body 100 is curved, or the opposite ends of the first welding pattern 300B or the second welding pattern 400B are curved. Moreover, the distance L between two ends is less than 5 mm. That is, the lengths of the first welding pattern 300B and the second welding pattern 400B along the longitudinal axis of the heat transmitting device H can be less than 5 mm.

Figure 6A:
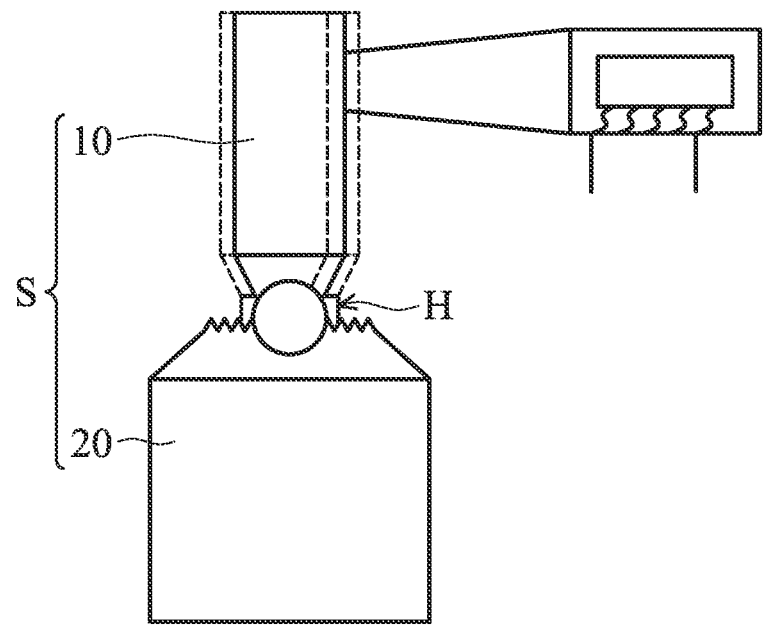
FIG. 6A is a schematic diagram of a heat transmitting device disposed on a welding apparatus according to an embodiment of the invention.
Figure 6B:
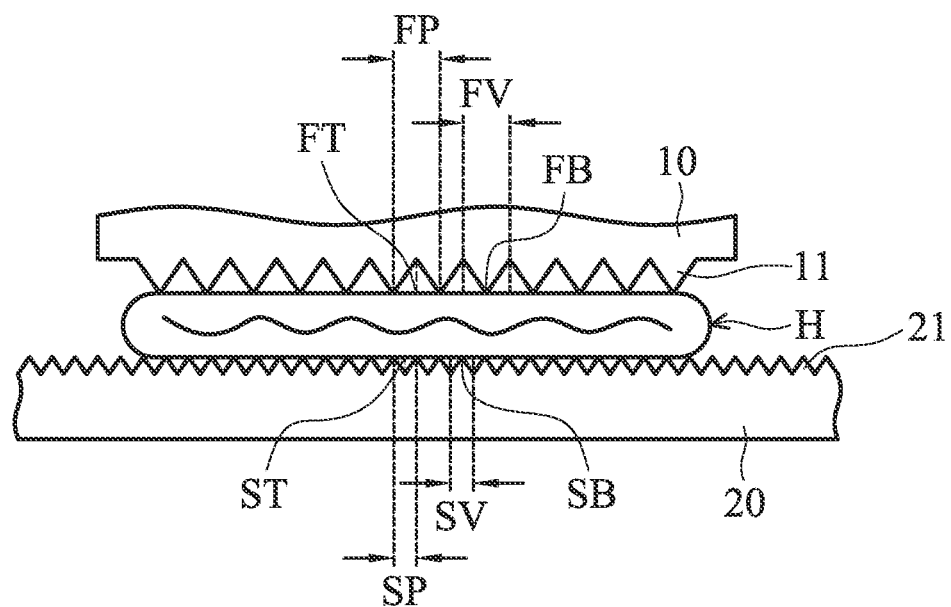
FIG. 6B is a schematic diagram of the heat transmitting device clamped between a welding head and a bottom according to an embodiment of the invention.

The forming method of the heat transmitting device H is discussed below. Referring to FIGS. 6A and 6B, the user can seal the opening 120 of the main body 100 of the heat transmitting device H via a welding apparatus S. The welding apparatus S includes a welding head 10 and a bottom 20. The heat transmitting device H with the unsealed opening 120 can be disposed between the welding head 10 and the bottom 20. The welding head 10 and the bottom 20 can clamp the heat transmitting device H and apply a vibration to the heat transmitting device H, so as to form the integrating portion 200 and seal the opening 120.

Referring to FIGS. 6A and 6B, the welding head 10 and the bottom 20 include different compression structures 11 and 21. For example, the number or the density of the protrusions on the compression structure 11 is different from that on the compression structure 21, and/or the shape of the compression structure 11 is different from the shape of the compression structure 21. Therefore, when the heat transmitting device H is welded by the welding apparatus S, a space can be generated to exhaust the overflow, and the seal tightness of welding can be enhanced. Furthermore, the opposite sides of the opening 110 can be entirely sealed, a gap communicating with the accommodating space 110 will not be generated. The air tightness of the heat transmitting device H can be increased, and the life of the heat transmitting device H can be extended. Moreover, the region of welding can be reduced, the dimension of the heat transmitting device H can be miniaturized.

Figure 4A:
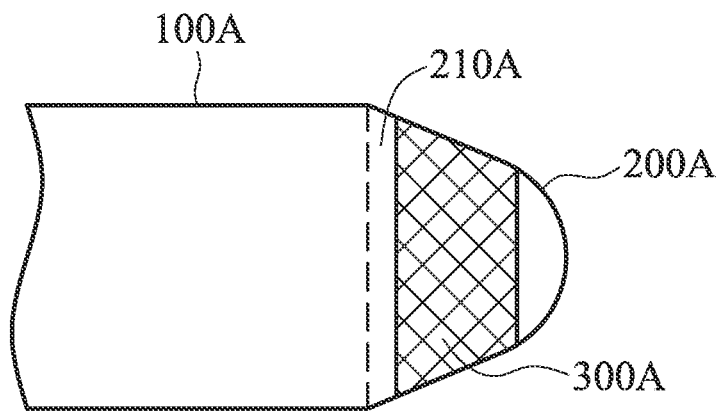
FIG. 4A is a schematic diagram of a first welding pattern according to another embodiment of the invention.
Figure 4B:
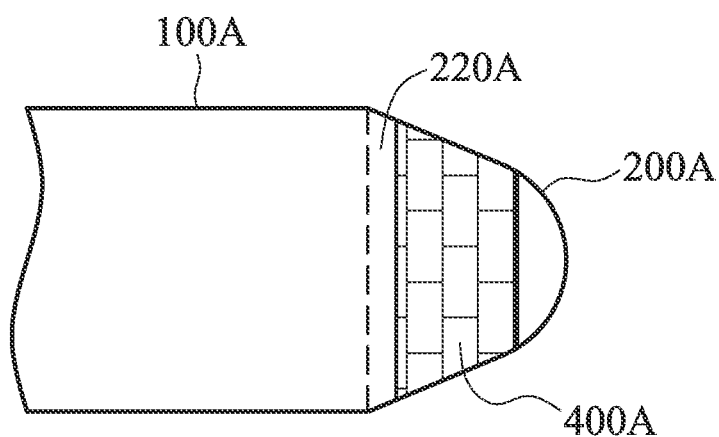
FIG. 4B is a schematic diagram of a second welding pattern according to another embodiment of the invention.

By using the welding apparatus S to form the heat transmitting device H, the integrating portion 200 shown in FIGS. 3A and 3B, the integrating portion 200A shown in FIGS. 4A and 4B, or the integrating portion 200B shown in FIGS. 5A and 5B can be generated. The opposite surfaces of the integrating portion can include asymmetric patterns. As shown in FIG. 6B, the bonding surface of the heat transmitting device H after welding is not smooth, so that the break of the heat transmitting device H due to the stress concentration can be prevented.

Moreover, as shown in FIG. 6B, after the heat transmitting device H is formed, the upper surface of the integrating portion 200 can have a plurality of first peak structures FP and a plurality of first valley structures FV, and the lower surface of the integrating portion 200 can have a plurality of second peak structures SP and a plurality of second valley structures SV. Each of the first peak structures FP has a first top portion FT, each of the first valley structures FV has a first bottom portion FB, each of the second peak structures SP has a second top portion ST, each of the second valley structures SV has a second bottom portion SB. Two adjacent first top portions FT can be projected onto the lower surface of the integrating portion 200 to form an area. Two second top portions ST and one second bottom portion SB are disposed in this area, or one second top portion ST and two second bottom portions SB are disposed in this area.

In summary, a heat transmitting device is provided, including a main body and an integrating portion. The main body has at least one opening. The integrating portion is used to seal the opening, and has a first surface and a second surface opposite the first surface. A first welding pattern is formed on the first surface, a second welding pattern is formed on the second surface, and the position of the first welding pattern corresponds to that of the second welding pattern. The type of the first welding pattern and the type of the second welding pattern are asymmetric.

A heat transmitting device is provided, including a main body and an integrating portion. The main body has at least one opening. The integrating portion is used to seal the opening, and has a first surface and a second surface opposite the first surface. A first welding pattern is formed on the first surface, a second welding pattern is formed on the second surface, and the position of the first welding pattern corresponds to that of the second welding pattern. The pattern density of the first welding pattern is different from the pattern density of the second welding pattern.

A heat transmitting device is provided, including a main body and an integrating portion. The main body has at least one opening. The integrating portion is used to seal the opening, and has a first surface and a second surface opposite the first surface. A first welding pattern is formed on the first surface, a second welding pattern is formed on the second surface, and the position of the first welding pattern corresponds to that of the second welding pattern. The pattern design of the first welding pattern is different from the pattern design of the second welding pattern.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A heat transmitting device, comprising:
a main body, having an opening; and
an integrating portion, sealing the opening of the main body, wherein in an extending direction of the main body, the integrating portion has a bonding surface, an upper surface, and a lower surface opposite the upper surface, the upper surface has a plurality of first peak structures and a plurality of first valley structures, and the lower surface has a plurality of second peak structures and a plurality of second valley structures,
wherein a projection of each of the first valley structures along a valley direction on the lower surface overlaps at least two whole or part of the second valley structures,
wherein the bonding surface is not smooth, and
wherein the first valley structures extend linearly, the second valley structure also extend linearly, and the first valley structures and the second valley structures intersect from each other.

2. The heat transmitting device as claimed in claim 1, wherein the integrating portion has a tapered structure.

3. The heat transmitting device as claimed in claim 1, wherein the integrating portion has a first end and a second end opposite the first end, the first end is connected to the main body and has a first width, and the second end has a second width, wherein the second width is 0.5-1.2 times the first width.

4. The heat transmitting device as claimed in claim 1, wherein the integrating portion has a first end and a second end opposite the first end, the first end is connected to the main body and has a first width, and a distance is formed between the first end and the second end, wherein the distance is 1.0-1.5 times the first width.

5. The heat transmitting device as claimed in claim 1, wherein the integrating portion has a first end and a second end opposite the first end, and a width of the first end is substantially the same as a width of the main body.

6. The heat transmitting device as claimed in claim 1, wherein the integrating portion is a heat pipe or a vapor chamber.

7. The heat transmitting device as claimed in claim 1, wherein an end of the integrating portion connected to the main body is curved.

8. The heat transmitting device as claimed in claim 1, wherein the integrating portion comprises:
a first welding pattern, formed by the first peak structures and the first valley structures; and
a second welding pattern, formed by the second peak structures and the second valley structures, wherein a position of the first welding pattern corresponds to a position of the second welding pattern, and a pattern density of the first welding pattern is different from a pattern density of the second welding pattern.

9. The heat transmitting device as claimed in claim 8, wherein the integrating portion has a tapered structure.

10. The heat transmitting device as claimed in claim 8, wherein the integrating portion has a first end and a second end opposite the first end, the first end is connected to the main body and has a first width, and the second end has a second width, wherein the second width is 0.5-1.2 times the first width.

11. The heat transmitting device as claimed in claim 8, wherein the integrating portion has a first end and a second end opposite the first end, the first end is connected to the main body and has a first width, and a distance is formed between the first end and the second end, wherein the distance is 1.0-1.5 times the first width.

12. The heat transmitting device as claimed in claim 8, wherein the integrating portion has a first end and a second end opposite the first end, and a width of the first end is substantially the same as a width of the main body.

13. The heat transmitting device as claimed in claim 8, wherein an end of the integrating portion connected to the main body is curved.

14. The heat transmitting device as claimed in claim 1, wherein the integrating portion comprises:
    a first welding pattern, formed by the first peak structures and the first valley structures; and
    a second welding pattern, formed by the second peak structures and the second valley structures, wherein a position of the first welding pattern corresponds to a position of the second welding pattern, and a pattern design of the first welding pattern is different from a pattern design of the second welding pattern.

15. The heat transmitting device as claimed in claim 14, wherein the integrating portion has a tapered structure.

16. The heat transmitting device as claimed in claim 14, wherein the integrating portion has a first end and a second end opposite the first end, the first end is connected to the main body and has a first width, and the second end has a second width, wherein the second width is 0.5-1.2 times the first width.

17. The heat transmitting device as claimed in claim 14, wherein the integrating portion has a first end and a second end opposite the first end, the first end is connected to the main body and has a first width, and a distance is formed between the first end and the second end, wherein the distance is 1.0-1.5 times the first width.

18. The heat transmitting device as claimed in claim 14, wherein the integrating portion has a first end and a second end opposite the first end, and a width of the first end is substantially the same as a width of the main body.

19. The heat transmitting device as claimed in claim 14, wherein an end of the integrating portion connected to the main body is curved.

* * * * *